US011268558B2

(12) United States Patent
Dreyer

(10) Patent No.: US 11,268,558 B2
(45) Date of Patent: Mar. 8, 2022

(54) INJECTION MORTAR

(71) Applicant: Fraunhofer-Gesellschaft zur Förderung der angewandten Forschung e. V., Munich (DE)

(72) Inventor: Christian Dreyer, Niederwörresbach (DE)

(73) Assignee: Fraunhofer-Gesellschaft zur Forderung der angewand, Munich (DE)

( * ) Notice: Subject to any disclaimer, the term of this patent is extended or adjusted under 35 U.S.C. 154(b) by 709 days.

(21) Appl. No.: 16/067,507

(22) PCT Filed: Dec. 16, 2016

(86) PCT No.: PCT/EP2016/081450
§ 371 (c)(1),
(2) Date: Jul. 2, 2018

(87) PCT Pub. No.: WO2017/114667
PCT Pub. Date: Jul. 6, 2017

(65) Prior Publication Data
US 2019/0010972 A1 Jan. 10, 2019

(30) Foreign Application Priority Data
Dec. 30, 2015 (DE) .................. 10 2015 122 950.1

(51) Int. Cl.
*F16B 39/02* (2006.01)
*F16B 13/14* (2006.01)

(52) U.S. Cl.
CPC ................. *F16B 13/141* (2013.01)

(58) Field of Classification Search
CPC ..... F16B 13/141; F16B 13/142; F16B 13/145
USPC .......................................... 411/82
See application file for complete search history.

(56) References Cited

U.S. PATENT DOCUMENTS

| 4,744,757 | A  | * | 5/1988 | Adair | ................ | A61C 13/0006 |
| | | | | | | 433/180 |
| 7,726,863 | B2 | * | 6/2010 | Brandstaetter | ........... | A61B 1/24 |
| | | | | | | 362/572 |
| 8,240,383 | B2 | * | 8/2012 | Xu | ........................ | C09K 8/805 |
| | | | | | | 166/280.2 |

(Continued)

FOREIGN PATENT DOCUMENTS

| AU | 4717772 | 4/1974 |
| DE | 2247133 A1 | 4/1973 |

(Continued)

OTHER PUBLICATIONS

Hilti.; "HIT-HY-270." Injectable Adhesive Anchors; https://www.hilti.com/anchor-fasteners/injectable-adhesive-anchors/r8298802; Date acquired Oct. 1, 2018.

*Primary Examiner* — Gary W Estremsky
(74) *Attorney, Agent, or Firm* — Robert R. Mallinckrodt

(57) ABSTRACT

Injection mortar for anchoring a fastening element containing a chemical composition that can cure in a curing process, and means for initiating the curing process characterized in that the chemical composition cures when irradiated with electromagnetic radiation, the means for initiating the curing process is formed by a radiation source for electromagnetic radiation, and the radiation source is placed within the anchoring zone.

9 Claims, 1 Drawing Sheet

(56) References Cited

U.S. PATENT DOCUMENTS

| | | | | |
|---|---|---|---|---|
| 9,016,953 B2* | 4/2015 | Ott | ............... | G02B 6/3851 |
| | | | | 385/60 |
| 9,023,249 B2* | 5/2015 | Fathi | ............... | C09J 9/02 |
| | | | | 252/501.1 |
| 9,637,870 B1* | 5/2017 | Coe | ............... | E01D 19/08 |
| 2005/0170120 A1* | 8/2005 | Teitelbaum | ............... | E04C 5/07 |
| | | | | 428/36.91 |
| 2008/0154266 A1* | 6/2008 | Protopsaltis | ............... | A61F 2/441 |
| | | | | 606/76 |
| 2010/0239366 A1* | 9/2010 | Bahr | ............... | E04B 1/483 |
| | | | | 403/268 |
| 2013/0042461 A1* | 2/2013 | Tupper | ............... | B29C 66/73715 |
| | | | | 29/525.01 |
| 2014/0248106 A1* | 9/2014 | Rule | ............... | F16B 1/0014 |
| | | | | 411/504 |
| 2016/0001501 A1* | 1/2016 | Kogl | ............... | B29C 65/48 |
| | | | | 156/66 |
| 2016/0151944 A1* | 6/2016 | Hansen | ............... | B29C 35/0805 |
| | | | | 156/69 |
| 2018/0187707 A1* | 7/2018 | Bettermann | ............... | B29C 39/10 |

FOREIGN PATENT DOCUMENTS

| | | |
|---|---|---|
| DE | 102009031188 A1 | 12/2010 |
| DE | 102015203511 A1 | 9/2016 |
| EP | 0703197 A2 | 3/1996 |
| EP | 1937745 B | 7/2008 |
| EP | 2233753 A2 | 9/2010 |
| EP | 2357162 A1 | 8/2011 |
| EP | 3061978 A1 | 8/2016 |
| WO | WO 2007/042199 A1 | 4/2007 |

* cited by examiner

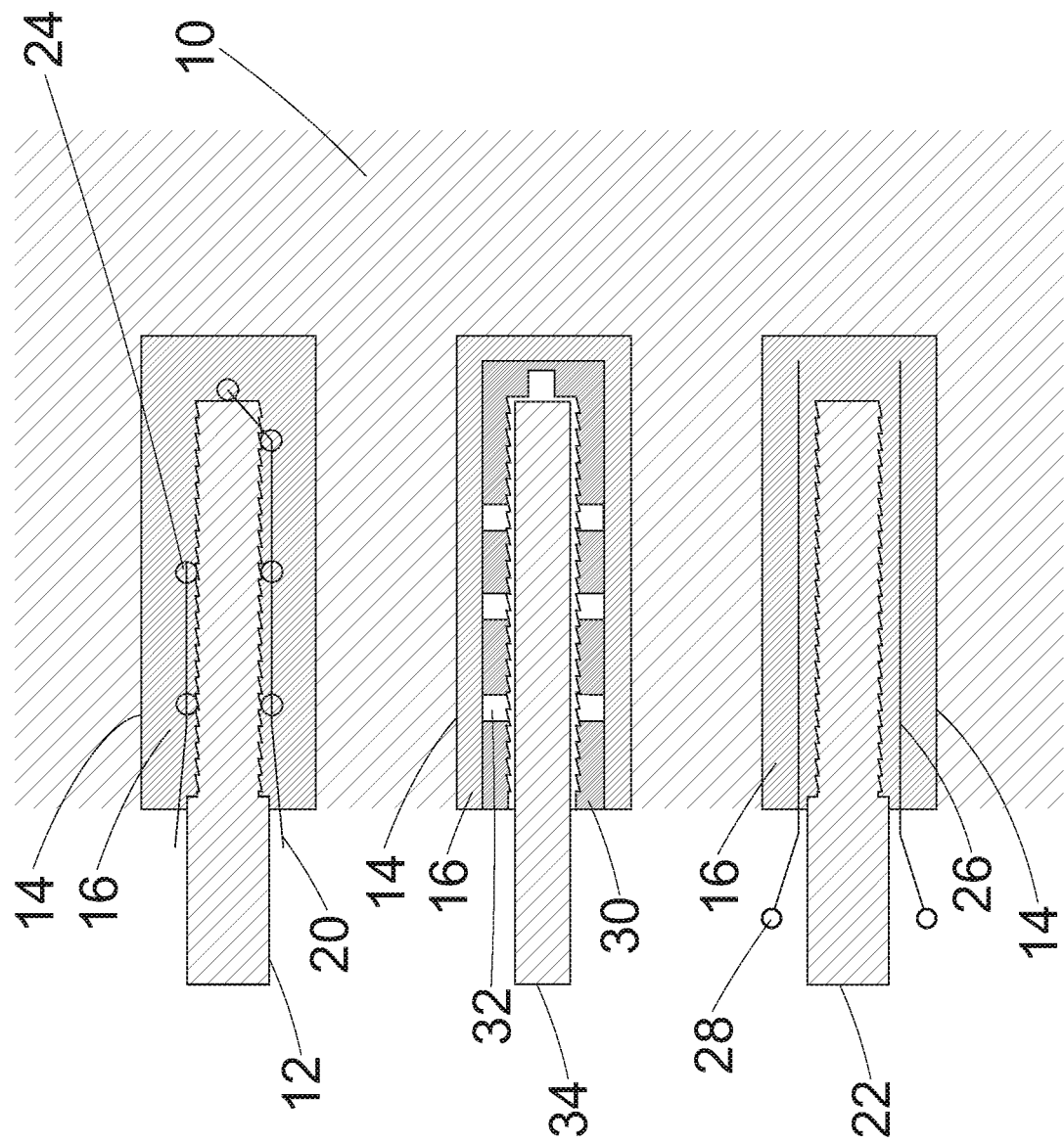

INJECTION MORTAR

TECHNICAL FIELD

The invention relates to an injection mortar for fixing a fixing element comprising
  (a) a chemical composition adapted to cure in a curing process; and
  (b) means for starting said curing process.

The injection mortar is also called a chemical screw anchor or shear connector. Typical fixing elements are threaded rods, which are also called anchor rods or armature bars. For fixing such fixing elements a chemical composition is inserted into a bore hole in the form of, for example, a cartridge. The bore hole then will form the injection mortar range. The injection mortar is not sheared as with a shear connector but hardened. The chemical composition thereby connects to the surrounding wall material. The fixing element is usually inserted together with the chemical composition into the injection mortar range.

PRIOR ART

From DE 22 47 133 chemical screw anchors on the basis of reactive resins are known for fixing fixing elements in concrete or brickwork. EP 0703197 B1, EP 2357162 B1 and EP 1937745 B1 disclose two-component systems for use as chemical screw anchors. Such screw anchors have a high firmness. Known chemical screw anchors, however, require a comparatively long time for curing depending on the bore hole temperature. Accordingly, a long time is needed for achieving the final firmness. Further chemical screw anchors will cure within a short time only. Then only a limited amount of time remains for the application and adjustment correction. Furthermore, it is a problem that the processing times and the curing times are very much temperature dependent. For example, a system will cure within a duration of 15 minutes at a temperature of 40° C. and within 6 hours at a temperature of −1° C.

With known chemical screw anchors it is provided that both components have a very limited processing time (so-called can time) after mixing, which is strongly dependent on the bore hole temperature. The system Hilti HIT-HY-270 disclosed on the internet website www.hilti.de is adapted, for example, to be processed at temperatures below +10° C. within 10 minutes, at temperatures between 20 and 29° C. within only four minutes and at temperatures at 40° C. within only one minute. The curing time is, again dependent on the temperature, between 6 hours at a temperature between −1 to 5° C. and 15 minutes at a temperature of +40° C. The enterprise Fischer offers quick systems on the basis of cartridges on its internet website www.fischer.de, which can be activated by screwing in a screw and which will cure within 2 minutes at room temperature. A correction or re-adjustment is not possible anymore with such systems already after a few seconds after opening the cartridge.

Curing of reactive resins with ultraviolet (UV-) radiation is known. UV-curing coatings are, for example, used in the automotive field and in the printing industry in the form of UV curing colors. For the manufacturing of fiber composites UV-reactive resins are used. They are also used as glues. The UV-curing is possible with only a comparatively small penetration depth. This is caused by the absorption of the resins and the required photoinitiator. Depending on the wavelength the upper limit is a little over one centimeter.

DE 10 2015 203 511 A1 discloses a fixing rod made of an endless fiber reinforced composite with a metal sleeve. The fixing rod is glued into the bore hole in a brickwork. Fixing portions can be fixed at said sleeve. It is explicitly provided that the fixing rod does not consist of metal. The printed document discloses that the fixing rod may be formed by glass fibers and that a one-component gluing system is used which cures upon exposure to UV light.

DISCLOSURE OF THE INVENTION

It is an object of the invention to provide an injection mortar of the above mentioned kind which has a particularly high stability and which quickly cures at a freely selectable point in time.

According to the invention this object is achieved in that
  (c) the chemical composition cures upon exposure to electromagnetic radiation;
  (d) the means for starting said curing process is formed by a radiation source for electromagnetic radiation; and
  (e) the radiation source is provided within the injection mortar range.

A suitable composition is, in particular, a reactive resin which may be reinforced by glass fibers or glass powder. Examples for such UV-curing reactive resins are: acrylic resins, epoxides, unsaturated polyester resins and vinyl ester resins.

A chemical composition is used with the present invention which is cured by radiation. The radiation source is directly positioned within the range of the injection mortar. Therefore, no large penetration depth for the radiation is necessary. Accordingly, there is the possibility for re-adjustment after inserting the chemical composition and the anchor in the bore hole. A particularly quick curing can be effected with switched-on radiation source. If the chemical composition is protected from radiation the materials can be stored for a long time without problems.

With the invention new, very quick fixing systems can be developed for construction applications which have a very high storage stability. Such development will put the construction industry in the position to fix fixings quicker, more reliably and furthermore mostly resistant to weather conditions, i.e. mainly temperature independent. The invention enables that fixing elements can be fixed with UV-curing screw anchors in a matter of seconds and be loaded within very short times which will have positive effects for the construction progress. Furthermore, the fixing elements can be adjusted without hurry at complex and/or difficult accessible positions.

The invention can be used, in particular, in the range of construction and in construction chemistry. An extension of the application ranges to further branches, such as, for example, light weight construction for wind energy plants, planes, ships or trains are also possible.

Preferably, it is provided that the chemical composition cures upon exposure to the radiation from the radiation source with a wavelength in the range between 300 nm and 420 nm, preferably in the range between 330 and 420 nm and most preferably in the range between 360 and 420 nm. Such radiation can be generated, for example, by light emitting diodes (LED). The longer the wavelength is the longer will be the penetration depth. The intensity normalized costs for LEDs are decreasing with longer wavelengths.

In a first variation of the invention, it is provided that the radiation source entirely or partly remains in the injection mortar range. In particular the radiation source may comprise at least one light emitting diode which is arranged in the injection mortar range and which has contacts for the current supply and for the control outside the injection mortar range. The rapid development towards ever more efficient and less expensive UV-LEDs enables the use of the invention. In particular, UV-LEDs are suitable for the singular use which do not comply with the specifications for long term use and which would be disposed of otherwise as off-specification batches. It is not necessary to carry out expensive optimizing of the operation, for example regarding the generated excess heat. The LED is switched on only once for a short time. It is not needed anymore thereafter.

Alternatively, it can be provided that the radiation source comprises at least one optical fiber, which is arranged in the injection mortar range and which is fed with light from outside the injection mortar range. The radiation source itself may then be used several times. Only a portion of the optical fiber remains in the injection mortar range.

In a third alternative modification of the invention, it is provided that
(a) a sleeve is provided which is adapted to be inserted into the injection mortar range;
(b) the sleeve is provided with ranges, which are transparent for the radiation of the radiation source; and
(c) the radiation source is adapted to be retractably inserted into the sleeve.

The sleeve may be fully transparent for the radiation. It may, however, also be provided that the sleeve is formed of an inexpensive plastic material or metal which is opaque for the radiation and which is provided with openings which are covered by transparent film or quartz glass layers or other UV-transparent materials. The film or quartz glass layer prevents that the chemical composition enters the inside of the sleeve. The sleeve may have the form of a threaded sleeve. With such a modification the sleeve will fully protect the radiation source and enables its re-use. The radiation enters the range outside the sleeve through the openings and thereby initiates the curing process. With sufficiently small openings and sufficiently high viscosity of the chemical composition no accountable amount of resin will enter the sleeve and the covering of the windows may not be necessary.

In a particularly advantageous embodiment of the invention the chemical composition is formed by a radiation-chemically curable 1-component reactive resin. The reactive resin will then not require any further chemical treatment and can be easily stored and used as long as it is not exposed to an activating radiation.

Modifications of the invention are subject matter of the subclaims. An embodiment is described below in greater detail with reference to the accompanying drawings.

BRIEF DESCRIPTION OF THE DRAWINGS

FIG. 1 shows a cross section of a wall with three different injection mortars.

DESCRIPTION OF THE EMBODIMENT

FIG. 1 shows a cross section of a wall 10 with three different injection mortars. A fixing element 12 and 22 shall be fixed at the wall by means of such injection mortar. In the present embodiments the fixing elements are formed by a threaded rod of stainless steel, another metal or an alloy. It is understood, however, that any other stable fixing element, such as a hook of stainless steel, another metal or an alloy or the like may be fixed.

A bore hole 14 is drilled into the wall 10 for preparation and, if necessary, cleaned. Similar to known injection mortars a cartridge with a curable chemical composition 16 is inserted into the bore hole 14 or the resin is directly injected by means of an injection or a cartridge. Contrary to known injection mortars, however, the chemical composition 16 consists of glass fiber reinforced one-component reactive resin which cures only upon exposure with UV light. The reactive resin will, therefore, not cure at first.

By screwing in of the fixing elements 12 or 22 the corresponding cartridge is opened. Its contents will enter into unevenness's and openings of the wall 10 surrounding the bore hole 14. LEDs 24 are provided in the bore hole. The LEDs 24 are contacted to the outside by conductors 20. When the fixing element 12 is correctly positioned and re-adjusted, if necessary, the LEDs 24 are switched on. A common electrical circuit and a current source are used for this purpose, which are not illustrated here for easier representation.

The LEDs 24 emit radiation with a radiation maximum in the range 360 to 420 nm. Upon exposure to light with such wavelength the reactive resin will very quickly cure. Provided the right blend and the right photoinitiator are used it will quickly cure with any wavelength in the above range. In the present embodiment 5 LEDs 24 sit around the covered portion of the fixing element 12 in the injection mortar range. Upon switching on, the LEDs 24 will illuminate the reactive resin whereby it can quickly cure, i.e. within seconds. The LEDs 24 will continuously remain in the injection mortar. The cured reactive resin has a high firmness similar to known injection mortars.

The fixing element 22 is also inserted into a cartridge with a curable chemical composition 16. No LEDs are provided therein, however, but optical fibers 26. The optical fibers 26 have an adapted emission profile. The optical fibers 26 do not serve to receive forces. The optical fibers 26 extend in a longitudinal direction up to almost the end of the bore hole. The optical fibers 26 must be selected such that they emit light sideways in order to cure the entire resin. Alternatively, several optical fibers with different lengths can be used which only emit light at the end. Light from a light source 28 is coupled into the optical fiber. Here also LEDs are suitable as a light source 28. Since the light source 28 is outside the bore hole and outside the injection mortar range, better, more expensive and larger light sources 28 may be used with this embodiment. They can be re-used. While each optical fiber in the representation is provided with its own light source 28, it is obviously also possible to feed light from a common light source 28 into several optical fibers. As with the use of sunken LEDs 24 the curing can be initiated simply by switching on the light source 28. After curing the light source 28 is separated and re-used if required. The optical fibers 26 are separated before the wall surface of the wall 10. The ends remain in the injection mortar range.

The center bore hole 14 is provided with reactive resin which is provided with a sleeve 30 in its inside. The sleeve 30 consists of metal with high firmness. Openings 32 are provided in the sleeve 30. A transparent film prevents the reactive resin 16 from entering the inside of the sleeve 30 through the openings 32. The sleeve 30 is provided with an inner thread adapted to have a fixing element screwed therein. For curing the optical fiber 34 or any other light source is inserted into the inside of the sleeve 30 and the light source is switched on. After curing the light source 34 can be removed from the sleeve 30 without damage. Then the fixing element (not shown) can be screwed in.

The invention claimed is:
1. Injection mortar for fixing a fixing element in an injection mortar range in a bore hole comprising

(a) chemical composition adapted to cure in a curing process; and means for starting said curing process and wherein
(b) said chemical composition cures upon exposure to electromagnetic radiation;
(c) said means for starting said curing process is formed by a radiation source for electromagnetic radiation;
(d) said radiation source is configured to be placed within said injection mortar range when inserted into said bore hole; and
(e) wherein said radiation source comprises at least one optical fiber which has a light input end for a light supply and for a control outside said injection mortar range, and wherein
   (i) said at least one optical fiber is arranged in said injection mortar range, and wherein said at least one optical fiber is configured to entirely or partly remain in said injection mortar range, or
   (ii) a sleeve is provided surrounding said at least one optical fiber, wherein said sleeve is configured to entirely or partly remain in said injection mortar range and wherein said sleeve and said optical fiber are configured to have said optical fiber retract from said sleeve remaining in said injection mortar range.

2. The injection mortar of claim 1, and wherein said chemical composition is a reactive resin.

3. The injection mortar of claim 2, and wherein said reactive resin is reinforced with glass fibers or glass powder.

4. The injection mortar of claim 1, and wherein said chemical composition cures upon exposure to said radiation from said radiation source with a wavelength in a range between 300 nm and 420 nm.

5. The injection mortar of claim 1, and wherein said chemical composition cures upon exposure to said radiation from said radiation source with a wavelength in a range between 330 nm and 420 nm.

6. The injection mortar of claim 1, and wherein said sleeve is provided with ranges, which are transparent for said radiation of said radiation source.

7. The injection mortar of claim 6, and wherein said sleeve is formed by a plastic material or metal which is opaque for said radiation and which is provided with openings which are covered by a transparent film or glass layers.

8. The injection mortar of claim 1, and wherein said sleeve has a form of a threaded sleeve.

9. The injection mortar of claim 1, and wherein said chemical composition is formed by a radiation-chemically curable 1-component reactive resin.

* * * * *